A. P. McKAY.
HITCH FOR TRACTOR PLOWS.
APPLICATION FILED JAN. 10, 1921.
1,436,595.
Patented Nov. 21, 1922.
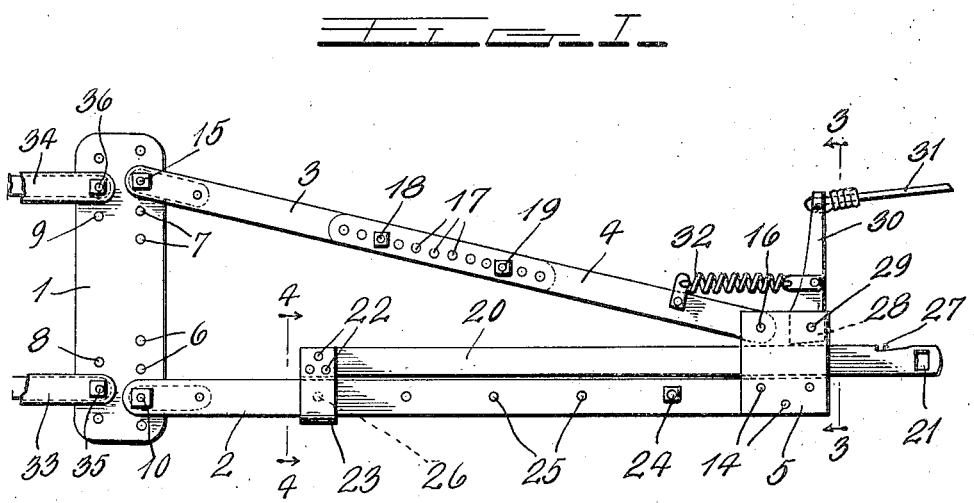
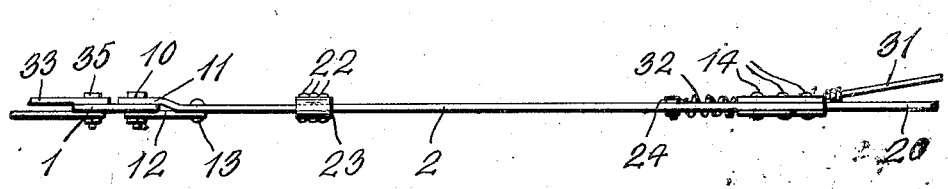
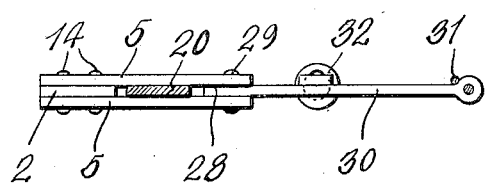
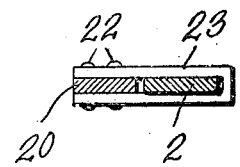
Inventor
A. P. McKay
By Wilkinson & Giusta,
Attorneys Patented Nov. 21, 1922.

1,436,595

UNITED STATES PATENT OFFICE.

AUGUSTA POSTELLE McKAY, OF ROME, GEORGIA, ASSIGNOR TO McKAY DISK PLOW CO., OF ROME, GEORGIA, A CORPORATION OF GEORGIA.

HITCH FOR TRACTOR PLOWS.

Application filed January 10, 1921. Serial No. 436,287.

*To all whom it may concern:*

Be it known that I, AUGUSTA P. McKAY, a citizen of the United States, residing at Rome, in the county of Floyd and State of Georgia, have invented certain new and useful Improvements in Hitches for Tractor Plows; and I do hereby declare the following to be a full, clear, and exact description of the invention, such as will enable others skilled in the art to which it appertains to make and use the same.

The present invention relates to improvements in draft appliances for plows, and more particularly refers to a draft appliance or hitch for connecting orchard plows to tractors.

An object of the invention is to provide an improved automatic draft appliance which will permit the plows to be drawn close to the tree trunks and beneath the low branches of fruit trees without causing damage to the fruit, while the tractor moves between the rows of trees also at a safe distance therefrom to prevent injury to the boughs or the fruit thereon.

It is of course desirable that the plows should travel as nearly as possible in a straight line behind the tractor to obtain the advantage of lighter draft, and it is another object of the invention to provide an improved draft appliance which shall be adjustable to cause the plows to follow the tractor in various lines of draft.

A further object of the invention is to provide a draft appliance which will be extensible for the purpose of allowing the tractor to precede the plows at the required distance, while being collapsible to enable the plows and tractor to approach each other so that they will form a compact unit or outfit able to turn in a short space as required by the minimum of room allowed at the headlands of orchards.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a top plan view of an improved draft appliance constructed according to the present invention;

Fig. 2 is an edge view thereof;

Fig. 3 is a sectional view taken on the line 3—3 in Fig. 1; and

Fig. 4 is a similar view taken on the line 4—4 also in Fig. 1.

Referring more particularly to the drawings, the improved draft appliance is constructed in preferably a substantial triangular form and is composed of a draft plate 1, a beam 2, a pair of bars 3 and 4, and plates 5.

The draft plate 1 is provided with series of perforations 6 and 7 extending in alinement at the forward portions of the plate and also with similar series of perforations 8 and 9 also extending in alinement rearwardly of the first line of perforations.

The beam 2 is adapted to be connected to the draft plate 1 by a bolt 10 which passes through one of the perforations 6 and the perforated and upwardly offset end 11 of the beam 2. A strap 12, shown in Fig. 2, is fitted beneath the beam 2 and beneath the draft plate 1 and is also perforated at its rear end to receive the bolt 10, while being riveted or otherwise secured to the beam 2 as indicated at 13. The beam 2 extends forwardly and between the plates 5 to which it is riveted or otherwise secured as indicated at 14.

The bar 3 is similarly secured to the draft plate 1 as by a bolt 15 entering a selected perforation 7. The perforations 6 and 7 allow the parts to be adjusted toward or from each other.

The bar 4, at its forward end, is pivoted at 16 between the plates 5, and the two bars 3 and 4 at their adjacent ends are overlapped and provided with series of perforations 17 adapted to be engaged by bolts or pins 18 and 19 in order to hold the bars in their adjusted position and prevent them from pivoting at an intermediate point.

A draw bar 20 slides freely between the plates 5 and is guided in its movement by the beam 2 at one side and the end of the bar 4 at its opposite side. This draw bar 20 is adapted to be attached to the tractor at its forward end and for this purpose it may be provided with a slot 21 to receive a coupling pin on the tractor. At its rear end rivets or other fastenings 22 are secured in order to attach to the draw bar 20 a substantially U-shaped yoke 23 which embraces the beam 2 and slides along the same.

A bolt or pin 24 may be placed in a selected perforation 25 in the beam 2 to act as a stop or abutment for the loop 23, these parts acting to limit the forward extension of the draw bar 20. The yoke 23 may be provided with openings 26 adapted to aline with the perforations 25 so that the bolt 24 may be in common passed through the same in order to prevent the sliding movement of the draw bar 20, in which case the automatic feature hereinafter referred to is dispensed with and the draw bar made rigid with its frame.

In the forward end of the draw bar a shouldered notch 27 is made in such position and location as to be occupied by a dog 28 pivoted at 29 between the plates 5 and having an arm 30 extending up therefrom to which is attached a rope or cord 31 running forwardly to the tractor and in a convenient position to be grasped by the operator. A coil spring 32 extends between the arm 30 and the bar 4 and normally tends to cause the dog 28 to seek the notch 27.

The draft plate 1 receives the forward ends of the plow beams 33 and 34 which may be attached to it in any suitable number and which are adjustably connected by means of bolts 35 and 36 fitting selectively in the perforations 8 and 9.

In use, the tractor is connected with the draw bar 20, for instance, by a coupling pin engaging through the slot 21. The plow beams 33 and 34 are provided with a suitable number of discs or plows and the line of draft of such plows with respect to the tractor is regulated by the adjustment of the bars 3 and 4. These bars are moved toward or from each other on the removal of the bolts or pins 18 and 19 and this adjustment causes the draft plate 1 to be shifted laterally with respect to the path of movement of the tractor and plows, and therefore shifts the plows toward or from the trunks of the trees.

The draw bar 20 will be pulled out a sufficient distance permitted by the location of the bolt 24 in order to secure the proper spacing between the tractor and the plows. The dog 28 is normally disengaged from the slot 27 so as to permit of the extension of the draw bar 20 in the normal drawing of the plows. When, however, a headland is reached, the tractor is backed forcing the draw bar 20 into the triangular frame and bringing the notch 27 into position to be engaged by the dog 28.

The spring 32 will automatically seat the dog 28 in the notch 27 and will keep it here until the dog is positively lifted out of the notch. The draft will therefore be taken up rigidly by the dog and both tractor and plows form a closely assembled unit or outfit capable of turning in a short space in the minimum room provided at the headland. After the turning has been effected and the apparatus is in readiness to proceed down the next row, the operator may jerk or pull upon the cord or rope 31 which will swing the dog 28 out of the notch 27 in opposition to the influence of the coil spring 32. The further pulling of the tractor will then cause the extension of the draw bar 20 until its yoke 33 strikes the abutment or pin 24.

The draft appliance is reversible, that is, it may be inverted or turned completely over. This may be easily accomplished by removing the bolts 10 and 15 from the draft plate 1, and after the appliance is reversed the beam 2 is connected by its bolt with one of the perforations 7, while the bar 3 is connected by its bolt 15 with one of the perforations 6. This permits the plows to work at the opposite side of the tractor and its reversible character permits the plows to work on either side of the tractor. This latter feature is of value inasmuch as, in orchard culture the plowing is alternated, that is, during one season the soil is thrown to the trees, while at the next season the soil is thrown away from the trees. The improved draft appliance constructed according to this invention is therefore especially of value in orchard culture.

It is obvious that various changes and modifications may be made in the details of construction and design of the above specifically described embodiment of this invention without departing from the spirit thereof, such changes and modifications being restricted only by the scope of the following claims.

What is claimed is:—

1. An improved draft appliance comprising a triangulated structure having converging side bars and a pair of connecting plates secured across the adjacent ends of the side bars, said ends of the side bars being spaced apart and forming with the plates a guide channel, a draw bar mounted to slide in said guide channel and against one of said side bars, means cooperably arranged on the draw bar and said side bar for limiting the extension of the draw bar, and a latch carried by said plates for releasably interlocking the draw bar when retracted.

2. An improved draft appliance comprising a triangulated frame having outwardly converging side bars and a plate secured across the outer ends of the side bars for holding the same in spaced apart relation and forming beneath the plate a guide channel, a draw bar slidably disposed upon one of said side bars and with its forward end projecting through said guide channel whereby said draw bar may be drawn out from and slid back into the frame, adjustable means on the draw and side bars for limiting the outward movement of the draw bar, said draw bar having a notch in one side at its outer end, and a spring-operated latch carried by said plate in line with said notch and adapted to slip into the latter when the draw bar is retracted.

AUGUSTA POSTELLE McKAY.